July 24, 1934.　　　G. L. FERGUSON ET AL　　　1,967,749
AUTOMATIC CLUTCH
Filed Jan. 22, 1932　　　5 Sheets-Sheet 1

INVENTORS.
Clarence C. Wood and
BY Gale L. Ferguson

Ray Oberlin & Ray
ATTORNEYS.

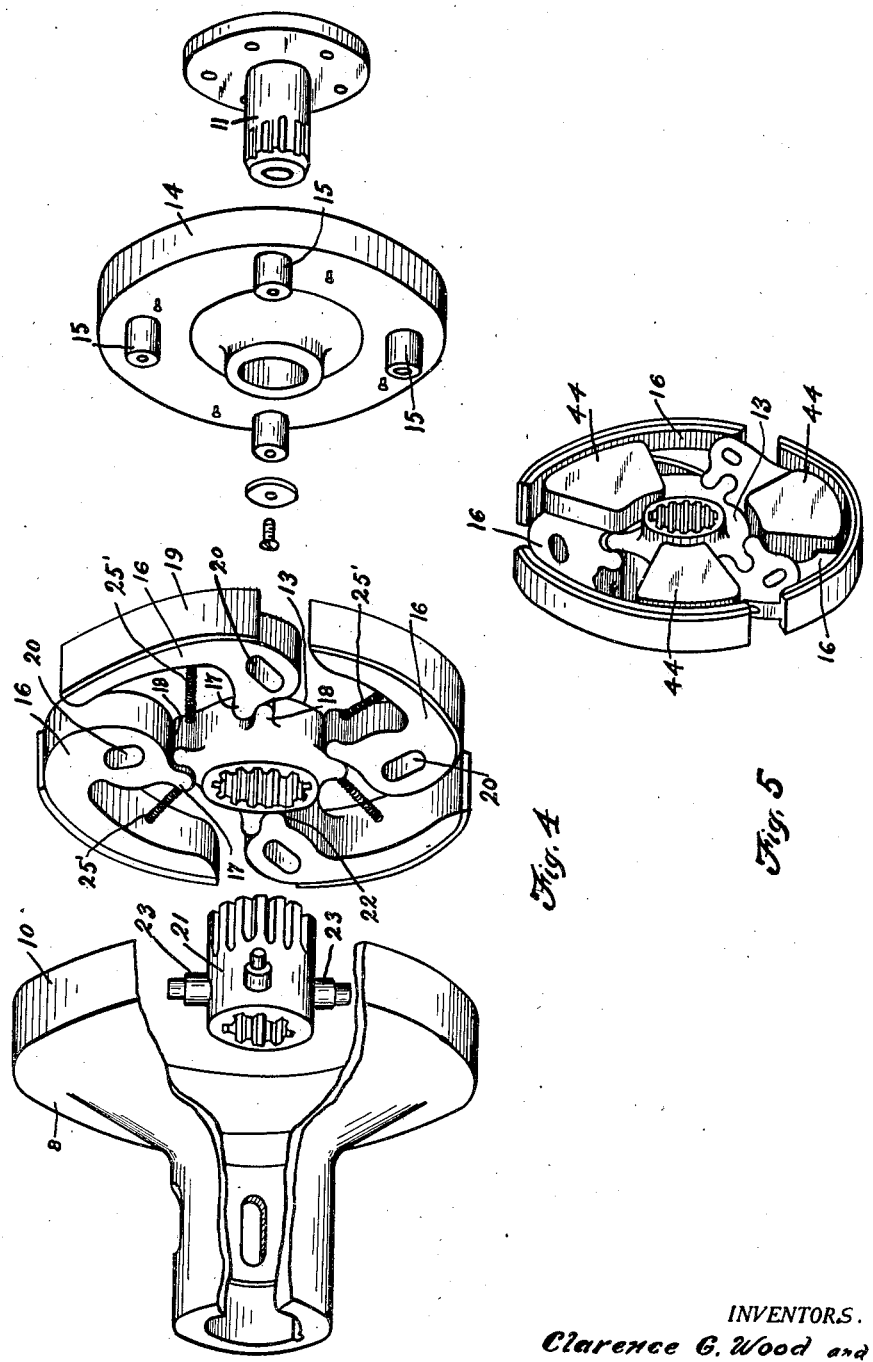

July 24, 1934.   G. L. FERGUSON ET AL   1,967,749
AUTOMATIC CLUTCH
Filed Jan. 22, 1932    5 Sheets-Sheet 4

INVENTORS.
Clarence C. Wood and
BY Gale L. Ferguson

Fay Oberlin & Fay
ATTORNEYS,

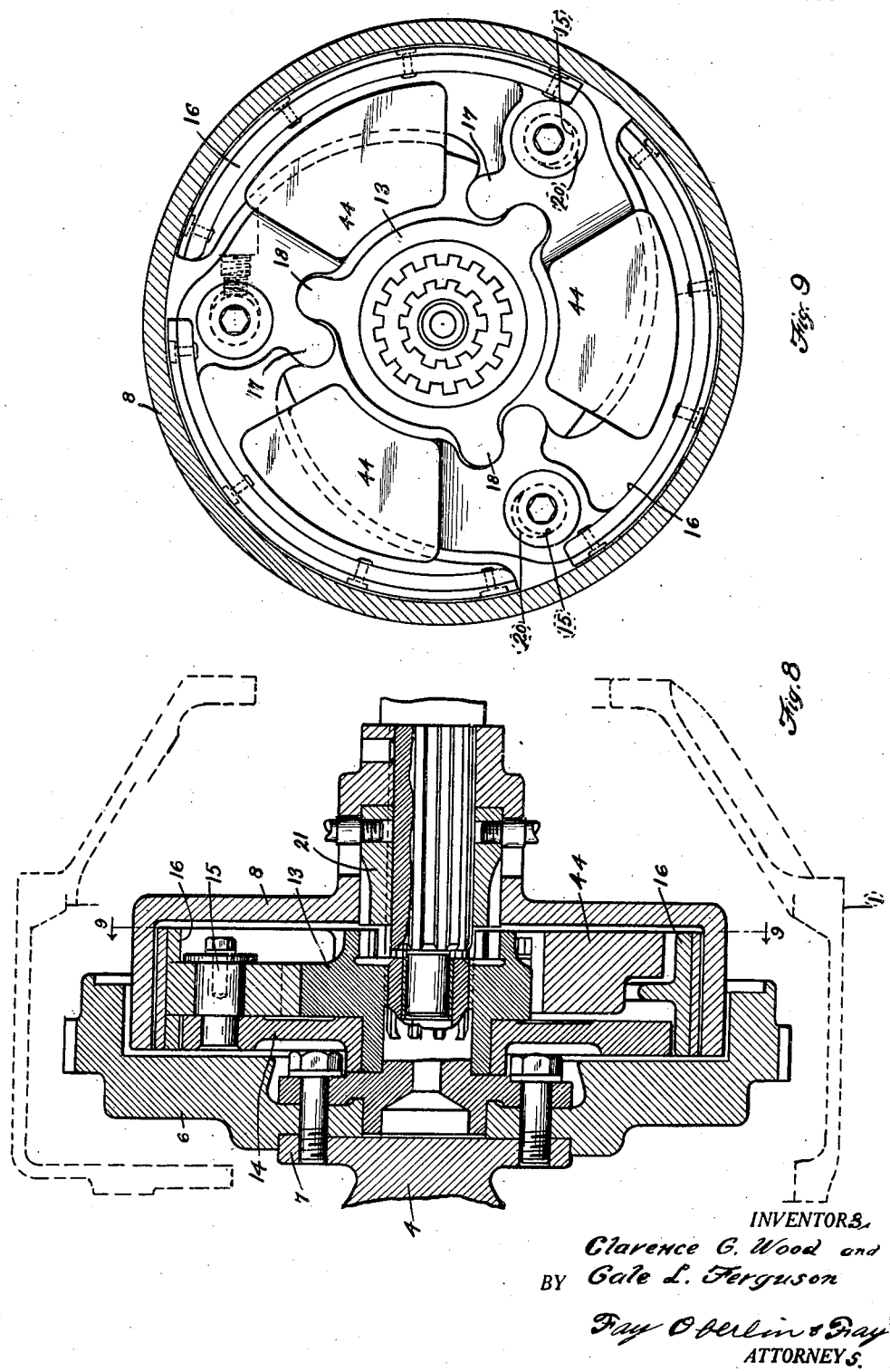

Patented July 24, 1934

1,967,749

UNITED STATES PATENT OFFICE 1,967,749

AUTOMATIC CLUTCH

Gale L. Ferguson, Euclid, and Clarence G. Wood, Cleveland Heights, Ohio

Application January 22, 1932, Serial No. 588,072

4 Claims. (Cl. 192—48)

The present invention relates to an automatic clutch particularly adaptable for installation in automotive vehicles propelled by internal combustion engines. The subject matter of the present invention deals with the provision of a device for automatically transferring torque from a driving member to a driven member, the actuation of said device being essentially dependent upon increase in acceleration of the driving member. This last-mentioned form of construction, therefore, makes it possible in automotive vehicles to shift the transmission without the necessity of depressing a clutch lever at each gear change; the only actuating operation necessary being to increase the acceleration of the engine or driving means.

It is a further object of our invention to provide an automatic clutch assembly which shall be easy to assemble, disassemble, and service; which shall possess no stiff or heavy actuating springs; and which may be readily installed in automotive vehicles formerly equipped with the old and well-known type of positive drive friction plate clutches. Another object is to provide means for automatically compensating for frictional wear upon the engaging elements of the clutch. A further object is to provide means aiding the disengagement of the clutching elements by virtue of the utilization of centrifugal force. Objects and advantages additional to those above enumerated shall become apparent as the following description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
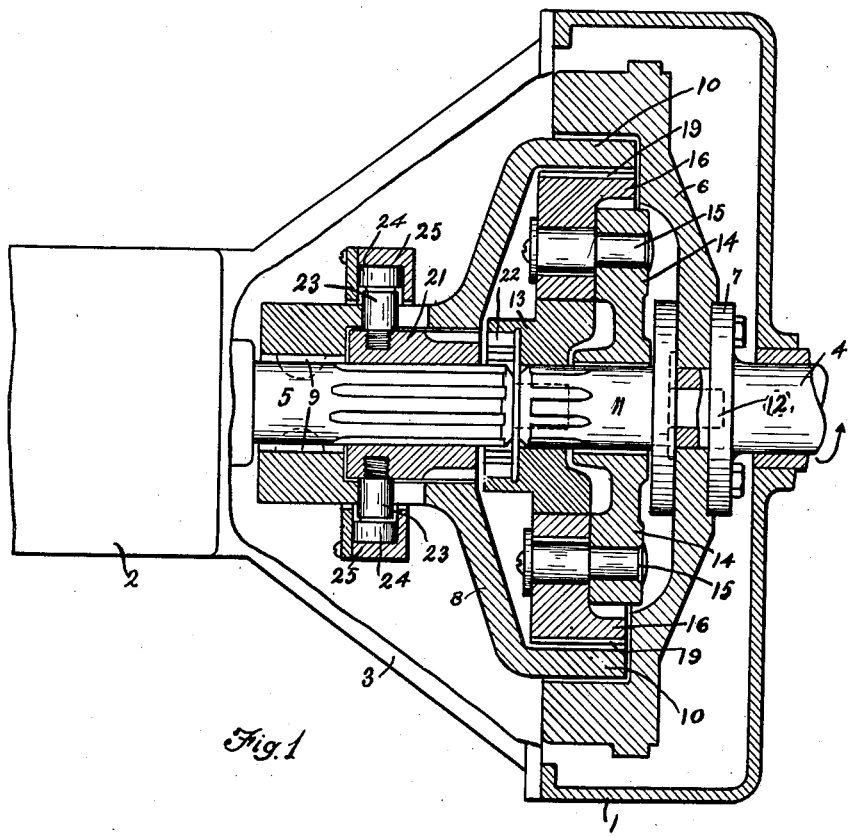
Figure 3:
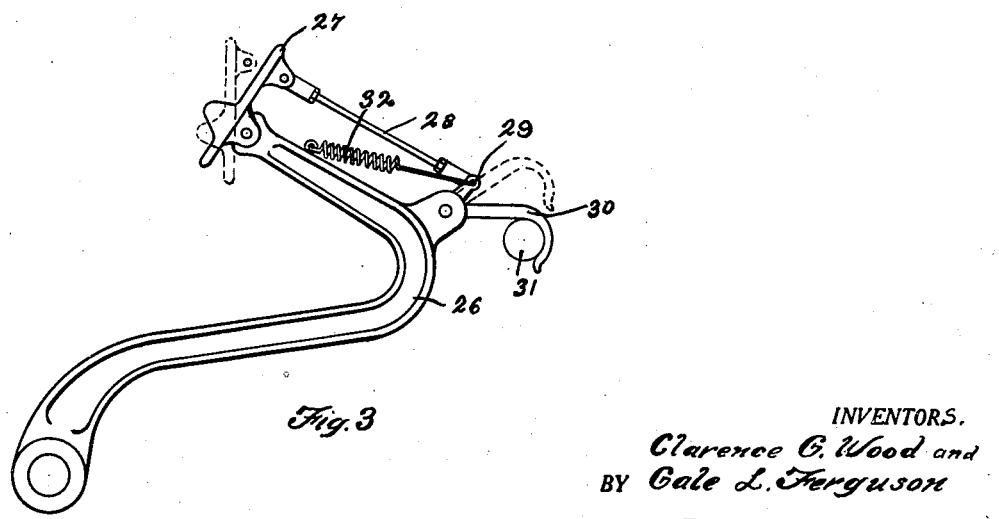
Figure 2:
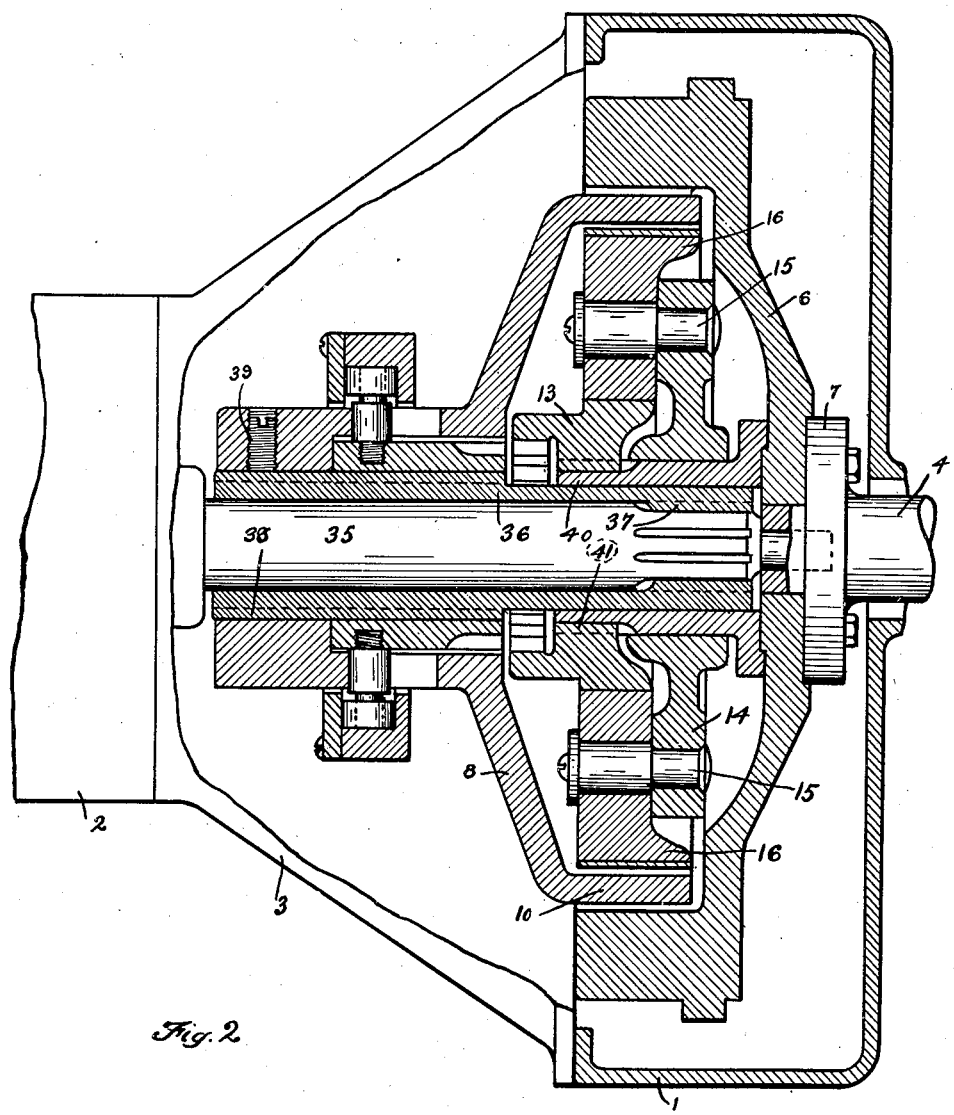
Figure 6:
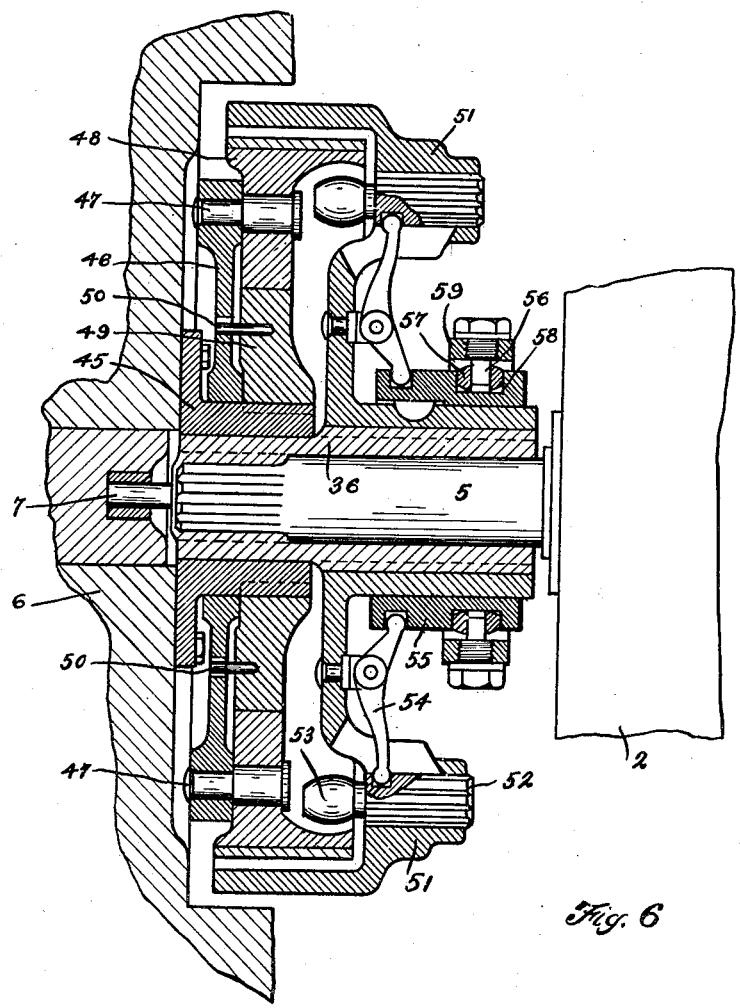
Figure 7:
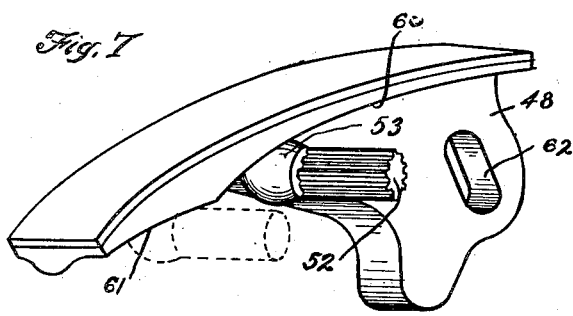

In said annexed drawings:

Fig. 1 is a longitudinal sectional view of one form of automatic clutch constructed according to the principles of our invention; Fig. 2 is another longitudinal sectional view on a slightly larger scale than that of Fig. 1, and showing a modified form of construction; Fig. 3 illustrates the clutch pedal locking mechanism utilized in conjunction with the clutch; Fig. 4 is a disassembled perspective view of the component parts of our automatic clutch; Fig. 5 is a perspective view of an alternative form of friction shoe mechanism; Fig. 6 is a longitudinal sectional view of an alternative form of automatic clutch construction; and Fig. 7 is an enlarged perspective view of a friction shoe as utilized in the construction shown in Fig. 6; Fig. 8 is a longitudinal sectional view of the form of clutch shown in Fig. 5 in assembled position; Fig. 9 is a section taken substantially upon line 9—9 of Fig. 8.

Referring more particularly to Fig. 1, there is shown the fly wheel housing 1 and the transmission housing indicated generally by the numeral 2, both being connected by the conical housing member 3. The crank shaft 4 is journaled in one end of the fly wheel housing 1, and constitutes the driving element from which the motive power is transmitted through the herein-described mechanism to the stub shaft 5 leading to the transmission 2. A fly wheel 6 is mounted upon the flanged end 7 of the crank shaft 4 by means of suitable studs or bolts, and therefore is a component part of the driving element assembly.

A driven member 8 which is keyed to the shaft 5 by means of suitable woodruff keys 9 has a flanged cylindrical portion 10 adapted to be positioned adjacent the inner periphery of the fly wheel 6.

A flanged shaft 11 is secured to the fly wheel 6 and has a projection 12 piloted into the end of the crank shaft 4. The outer end of the shaft 11 forms a tight splined fit with the hub 13. A circular disc or plate 14 is rotatably mounted upon the shaft 11 and carries a plurality of laterally extending pins 15 adjacent its outer circumference. The pins 15 in turn serve as means for pivotally mounting the friction shoes 16.

Now, directing attention to Figs. 1 and 4, it is seen that the shoes 16 have inwardly extending lugs 17 which in turn are adapted to be engaged by the projecting lugs 18 on the hub 13. The outer faces of the friction shoes 16 have a suitable friction facing material such as brake or clutch lining 19 secured thereto. The holes 20 in the friction shoes 16 are slotted in order that the shoes may have a radial movement in respect to their mounting pins 15 whereby the shoes may adjust themselves to the inner surface of the flange 10. A cylindrical member 21 has a sliding splined fit upon the shaft 5, and is likewise splined on its outer surface in order to engage with the corresponding splines 22 in the hub 13. The member 21 also carries a plurality of radially projecting pins 23 which in turn extend through slots in the hub of the driven member 8 and carry the rollers 24 which are adapted to travel in the annular race-way 25. The race-way 25 in turn is suitably connected to the clutch pedal 26 by means of any well known form of yoke and shaft connections which have not been deemed expedient to be shown herein.

Referring to Fig. 3, the clutch pedal 26 which is adapted to serve as a means for operably moving the member 21 to a forward or back position, has a pivotally mounted toe plate 27 connected by means of the adjustable pitman 28 and lever 29 to the hook latch 30. A fixed shaft or pin 31 may be provided for engagement by the latch 30. A tension spring 32 connected to the end of the lever arm 29 and the body of the clutch pedal 26 serves as a means tending to maintain the toe plate 27 and latch 30 in position as indicated by the dotted lines in Fig. 3.

The operation of the above described mechanism is as follows. The crank shaft 4 which is rotated in a direction indicated by the arrow in Fig. 1 positively rotates the fly wheel 6 and the hub 13. The lugs 18 on the hub 13 engaging with the lugs 17 on the inner ends of the friction shoes 16 tend to force the latter outwardly toward engagement with the inner surface of the cylindrical flange 10. Upon acceleration of the engine, the friction shoes will be more forcibly urged against the flange 10 until a sufficiently powerful pressure is exerted whereby the driven member 8 will be locked in engagement with the driving mechanism and torque will consequently be transmitted therebetween. On deceleration of the engine, the tension springs 25' will tend to overcome the centrifugal force which throws the friction shoes 16 outwardly, and to pull them out of engagement with the flange 10. It will thus be seen that the transmission of torque between the driving shaft 4 and the driven shaft 5 is dependent upon the fact of whether the driving member is operating at a greater rotational speed than that of the driven member. Similarly, the non-transmission of torque, or disengagement of the transmitting mechanism is dependent on the fact of whether the driven member is operating at a greater rotational speed than that of the driving member. By virtue of the above described mode of operation, it is possible to effect transmission gear change without the depression of a clutch pedal during each change, it being necessary merely to decelerate the engine in order to effect disengagement of the clutch. During the above operations the clutch pedal 26 is maintained in its locked down position as shown in Fig. 3, whereby the member 21 is out of engagement with the splines 22 on the hub 13.

When it is found necessary, however, to eliminate the automatic clutching function, the transmission gears are placed in neutral and the member 21 is moved into locking engagement with the hub 13 by means of releasing the clutch pedal from its locked down position. In order to put the car in reverse gear in case the clutch is assembled between the transmission and drive shaft, it is necessary that the member 21 be thrown into locking engagement.

The construction illustrated in Fig. 1 is intended to be originally installed in the automobile by the manufacturer. When it is found desirable, however, to replace the usual cushion plate type of clutch in an automobile assembly, the construction illustrated in Fig. 2 may be utilized. In the type of construction shown in Fig. 2, the shaft 35 leading forward from the transmission and which is already in place, would be used instead of the stub shaft 5 of Fig. 1. A sleeve 36 fits over the shaft 35 and is tightly splined at its end 37 to said shaft. The outside end 38 of the sleeve 36 is in turn tightly splined to the hub of the driven member 8. A set screw 39 may be provided in order to insure against the working loose of the tight spline 38. The shaft 11 is also replaced by the hollow shaft 40 which rotatably receives the end of the sleeve 36 and has a tight splined fit 41 with the hub 13. The remainder of the mechanism is otherwise similar to that shown in Figs. 1 and 4 except that the use of the sleeve 36 necessitates making the hubs of some of the other parts slightly larger.

In the alternative form of construction illustrated in Figs. 6 and 7, an annular projection 45 is bolted to the fly wheel 6. A circular disc or plate 46 similar to the above mentioned plate 14 is loosely mounted upon the outer circumference of the member 45. The plate 46 carries a plurality of laterally extending pins 47 adjacent its outer circumference. These pins serve as pivotal mounting pins for the friction shoes 48. A hub 49 similar in construction to the hub 13 already referred to is splined on the driving member 45 adjacent the circular plate 46, and also has a plurality of lugs adapted to engage with inwardly projecting lugs on the shoes 48. A plurality of pins 50 mounted in the hub 49 engage in slots in the circular plate 46 and serve to permit slight relative rotation between the parts 46 and 49, but at the same time serving as limit stops for the degree of such rotation.

The flanged driven member 51 carries a plurality of splined pins 52 which in turn carry the rollers 53 on their inner ends. The pins 52 are adapted to move longitudinally in their splined fittings in the driven member 51. Such longitudinal movement is actuated by means of the small lever arms 54 engaging with the collar 55. A plurality of pins 56 carrying the rollers 57 which travel in the race-way 58, are mounted in the annular yoke 59. Suitable connections may be provided between the yoke 59 and the clutch pedal 26.

The inner side of the friction shoe working faces are in the form of double cam surfaces 60 and 61. A slotted opening 62 is likewise provided in the shoe 48 similar to the slot 20 in the shoe 16.

The operation of the last described mechanism is as follows: Referring to Fig. 7 and assuming that the pins 52 are in a forward position, that is as shown by the full lines in Figs. 6 and 7, if the driven member and rollers attempt to revolve faster than the driving member, the rollers 53 will abut against the cam surface 60 and force the arms into engagement with the inner surface of the driven member 51, thus assuring positive engagement. Likewise, if the driving member 45 attempts to revolve faster than the driven member 51, the pins 52 and rollers 53 will assume the position as shown by the dotted lines in Fig. 7 and will abut against the cam surface 61, thus forcing the friction shoes into engagement with the inner surface of the driven member 51. When the pins 52 and rollers 53 are moved to their outer positions, that is, out of registry with the cam surfaces 60 and 61, the friction shoes will be actuated by the lugs on the hub 49 and function as a uni-directional torque transmission means in the same manner as the mechanisms above described and illustrated in Figs. 1, 2 and 4.

When it is not desired to use the tension springs 25' in order to counteract the centrifugal force exerted upon the friction shoes 16, the form of construction as illustrated in Fig. 5 may be resorted to. In this latter type of construction, the inner ends of the friction shoes opposite to the engaging surfaces carry the counter-balance weights 44. As wear on the shoe linings occurs, and the shoes move over slightly in their slotted holes, the balanced condition would be theoretically slightly disturbed. Practically, however, the balanced condition of the friction shoes is maintained due to the fact that wear upon the friction facings results in a removal of material tending to restore the balanced conditions.

It will thus be seen that we have provided a mechanism for intermittently transmitting torque in an automotive vehicle, which may be either automatically operated or controllably actuated at the will of the operator of the vehicle.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:

1. An automatic clutch mechanism comprising the combination of a driving member, a driven member, a circular plate rotatably positioned between said driving member and said driven member, a plurality of arcuately formed engaging shoes pivotally mounted on said plate, means associated with said driving member adapted to engage with the inner portions of said shoes to urge them into engagement with said driven member when the rate of rotation of said driving member becomes greater than the rate of rotation of said driven member, and elongated slots in said shoes adapted to permit relative radial movement thereof in respect to said pivotal mountings in order to compensate for frictional wear on said shoes.

2. An automatic clutch mechanism comprising the combination of a driving member, a driven member, and a plurality of pivotally mounted engaging shoes positioned between said driving and driven members and adapted to have engaging movement with said driven member in a radial plane of motion, said shoes having a double cam surface on their inner sides, and rollers carried by said driven member and adapted to bear against said cam surfaces in order to force said shoes into positive frictional engagement with said driven member.

3. An automatic clutch mechanism comprising the combination of a driving member, a driven member, and a plurality of pivotally mounted engaging shoes positioned between said driving and driven members and adapted to have engaging movement with said driven member in a radial plane of motion, and a plurality of lugs radially extending from said driving member and adapted to urge said shoes in a centrifugal direction toward engagement with said driven member when the rate of rotation of said driving member becomes greater than the rate of rotation of said driven member, said shoes having a double cam surface on their inner sides and rollers associated with said driven member and adapted to force said shoes into positive frictional engagement with said driving member.

4. An automatic clutch mechanism comprising the combination of a driving member, a driven member, and a plurality of pivotally mounted engaging shoes positioned between said driving and driven members and adapted to have engaging movement with said driven member in a radial plane of motion, said shoes having a double cam surface on their inner sides, and rollers carried by said driven member and adapted to bear against said cam surfaces in order to force said shoes into positive frictional engagement with said driven member, said rollers being reciprocably mounted in said driven member, and means for operably controlling the reciprocation of said rollers.

GALE L. FERGUSON.
CLARENCE G. WOOD.